March 17, 1970  J. B. KEATS  3,500,789
DISPLAY DEVICE
Filed Dec. 22, 1967
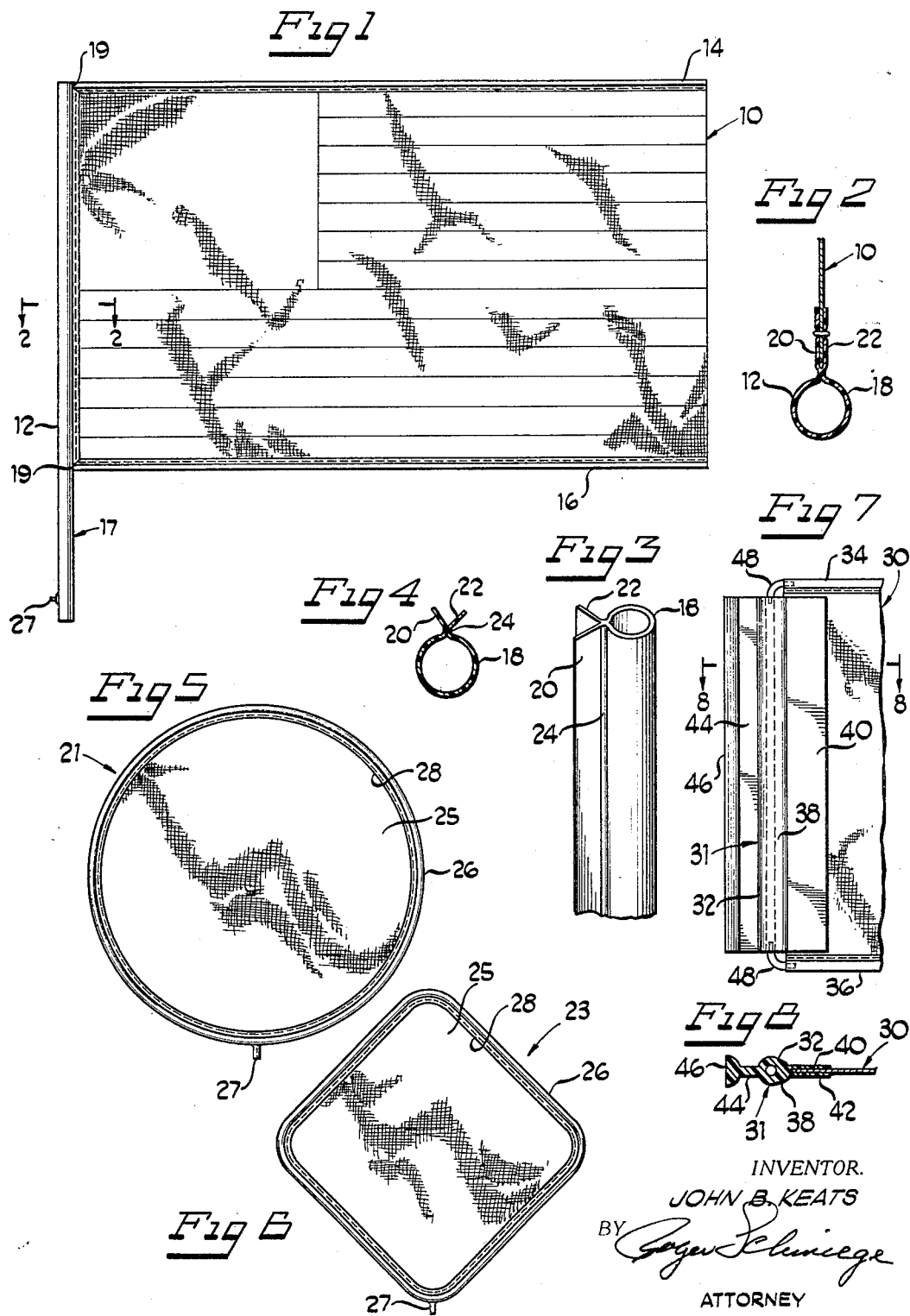
INVENTOR.
JOHN B. KEATS United States Patent Office 3,500,789
Patented Mar. 17, 1970

3,500,789
DISPLAY DEVICE
John B. Keats, Marietta, Ohio, assignor to Borg-Warner Corporation, Chicago, Ill., a corporation of Delaware
Filed Dec. 22, 1967, Ser. No. 692,825
Int. Cl. G09f 17/00
U.S. Cl. 116—173                                  7 Claims

ABSTRACT OF THE DISCLOSURE

An improved inflatable display device including a body of substantially flat flexible material forming a flag or sign supported by an inflatable flexible tubular member affixed to the periphery of the flat flexible material along a length sufficient to maintain the material in an unfurled display condition upon inflation of the tubular member. The tubular member includes integrally formed spaced apart flaps along its length. The flat flexible material of the flag or sign is positioned intermediate to flaps and secured thereto to form a display unit suitable for easy storage.

BACKGROUND OF THE INVENTION

In the past, display devices such as flags or signs have generally been supported by rigid staffs or poles. To retain such flags or signs in an unfurled or display condition rigid shafts or staves are sometimes secured to the horizontal edges of the flexible material.

Display devices such as those described are generally unsatisfactory because of the handling and storage problems associated with the rigid staffs and staves required to maintain the devices in an unfurled condition. Also, such an arrangement is unsuitable to display devices which are unusually large because of the weight of the rigid shafts or poles used. As can well be appreciated, this type of display device also includes an inherent fault in that it will not wave because of the presence of the rigid staves.

Attempts have been made to utilize easily collapsible means to support flags or signs. Such arrangements have included inflatable structures which support the display device when inflated but are flexible and can be easily stored when not in use. However, with such arrangments no satisfactory means has heretofore been devised to maintain the flag in an unfurled or display condition while retaining the quality of flexibility necessary for providing a flag which will wave. An example of a device using inflatable means to support a flag is shown in U.S. Patent No. 3,149,352. An inflatable staff portion is provided and a diagonally disposed stave is used which is also inflatable. This arrangement, however, does not insure retention of the display device in an unfurled condition.

Accordingly, it is the principal object of the present invention to provide an improved form of inflatable display device which insures retention of a flag or sign to be displayed in an unfurled condition when in use.

SUMMARY OF THE INVENTION

Very generally, this invention relates to a display device including a body of flexible material forming a flag or sign and inflatable tubular member secured to the periphery of the flexible material along a length sufficient to retain it in an unfurled display condition upon inflation of the tubular member. The inflatable tubular member includes integral longitudinally extending flaps along the length of the tubular member. The flexible material forming the sign or flag is disposed intermediate the flaps and is appropriately affixed to them to form the display unit.

The invention accordingly comprises an article of manufacture possessing the features, properties, and the relation of elements which will be exemplified in the articles hereinafter described, and the scope of the invention will be indicated in the claims.

For a fuller understanding of the nature and objects of the invention, reference should be had to the following detailed description taken in connection with the accompanying drawing.

DESCRIPTION OF DRAWINGS

FIGURE 1 is a plan view of a display device having an inflatable staff and inflatable staves fixed to it, for supporting it and maintaining it in a display position;

FIGURE 2 is a sectional view taken generally along the line 2—2 of FIGURE 1;

FIGURE 3 is a partial perspective view of the tubular material;

FIGURE 4 is a sectional view of the tubular material;

FIGURES 5 and 6 are plan views, illustrating two inflatable signs constructed in accordance with the invention; and FIGURES 7 and 8 are partial plan and top views, respectively, illustrating a staff and staves fabricated in accordance with a second embodiment of the invention.

Similar reference characters refer to similar parts throughout the several views of the drawing.

DETAILED DESCRIPTION

Referring now to the drawing, in FIGURE 1 there is illustrated a display device having a flag 10 of fabric or the like, an inflatable staff 12 affixed to it along its one side edge, and a pair of inflatable staves 14 and 16 affixed to it along its upper and lower edges, respectively. The staff 12, of course, supports the flag so as to permit it to be displayed. The staves 14 and 16 maintain the flag 10 unfurled. When constructed with the inflatable flag staff 12 and the staves 14 and 16, the flag 10 is generally rigidly supported so that its full surface is exposed, however, it will still wave due to the flexibility of the staves. In addition, the flag 10 is flexible so that it is inherently harmless, and so that it is easily handled for both storing and inflating it for display.

More specifically, the flag staff 12 and staves 14 and 16 are fabricated by rolling a length of material, preferably nylon or Dacron which is coated with uncured resilient, heat sealable material such as neoprene, a synthetic plastic material or a composition of rubber, to form a tube 18 (FIG. 4) with two outwardly extending flaps 20 and 22. The latter are provided by pinching the coated material together, as at 24, during the formation of the tube 18, and simultaneously curing the material. Curing the material heat seals the material together, so as to form both the tube 18 and the flaps 20 and 22 as shown.

The upper and lower ends of the tube 18 are closed, in any suitable fashion, as, for example, by pinching them closed while the material is being cured. A valve 27 for inflating and deflating the flag staff 12 is inserted within the tube 18, and is integrally affixed therein during the curing of the material.

The unused portions of the flaps 20 and 22 can be trimmed off as shown at 17, if desired, or simply folded neatly about the tube 18 and affixed to it.

The inflatable staves 14 and 16 are formed in a like manner and are affixed in air tight relation to the staff along seams 19. Appropriate openings are provided in the staff 12 at the connections with the staves 14 and 16 to allow inflation of all three elements utilizing the single valve 27.

The flag staff 12 is affixed to the flag 10 by inserting and fixedly securing, as by sewing, one of the edges of the flag between the flaps 20 and 22, as illustrated in FIG. 2. The staves 14 and 16 are affixed to the upper and lower edges of the flag 10 in a corresponding fashion.

The flag 10 is easily and conveniently stored since it does not include or use any rigid masts, staffs, staves and the life. The flag 10 can be simply folded or rolled up for storage since the flag 10 itself is of fabric, plastic or other similar material and the flag staff 12 and the staves 14 and 16 affixed to it are of a coated inflatable fabric.

To erect the flag 10, air is blown into the tube 18 forming the flag staff 12 and staves 14 and 16 until they are sufficiently rigid to support the flag in an unfurled or display condition. The rigidity and erectness of the flag 10 will depend upon the air pressure within the flag staff 12 and the staves 14 and 16.

When erected in the above described fashion, the flag 10 is sufficiently rigid to be supportingly held and unfurled, however, it is also sufficiently flexible to permit it to wave. Furthermore, the flag 10 is neat in appearance and is not cumbersome as in the case of flags having rigid wooden or metal staves therein, since the staves 14 and 16 are simply air-filled tubular members which are effectively hidden along its upper and lower edges so as to form an integral part of the flag 10.

In FIGS. 5 and 6, there are illustrated display devices in the form of signs 21 and 23, which are circular-shaped and square-shaped, respectively. The signs 21 and 23 each have a central fabric body portion 25 having an inflatable tube 26 which is formed like the flag staff 12 and the staves 14 and 16 about its entire periphery. The body portions 25 are affixed within the inflatable tubes 26, by inserting and securing them between flaps 28 such as the flaps 20 and 22 of the embodiment of FIGS. 1, 2 and 3 which are formed on the tubes in the manner described above.

It is readily apparent that while the inflatable tubular member is shown as extending around the entire periphery of the material it is only necessary that it extend around a length sufficient to retain the sign in a display condition when inflated.

The signs 21 and 23 like the flag 10 are easily erected simply by blowing air into the inflatable tubes 26. The fabric body portions 25 are drawn taut and held substantially rigid, by the pressure within the tubes which is exerted evenly outwardly at the periphery. The signs 21 and 23 also are easily and conveniently stored and/or transported, since they are flexible and can be folded or rolled up, as in the case of the flag 10.

In FIGS. 7 and 8, there is illustrated still another flag or sign 30 having a flag staff 31 in the form of air inflatable vinyl welt 32 along its one side edge and inflatable staves 34 and 36 like the staves 14 and 16 along its upper and lower edges, respectively. The inflatable vinyl welt 32 is formed by molding or extruding it and includes a tubular portion 38 having two flaps 40 and 42 along its length. A flat flange 44 having a generally semi-circular-shaped bead 46 along its outer edge is integrally affixed to the tubular portion, diametrically opposite the flaps 40 and 42. The flat flange 44 and the bead 46 provide additional rigidity to the flag staff 31. The fabric forming the flag or sign 30 is inserted and secured between the flaps 40 and 42, in the manner described above.

The staves 34 and 36 are coupled to the flag staff 31, by means of tubular elbows 48. A valve (not shown) can be integrally affixed to one or both of the staves 34 and 36, for injecting air into them and the flag staff 31.

It will thus be seen that the objects set forth above, among those made apparent from the preceding description are efficiently attained and, since certain changes may be made in the above articles without departing from the scope of the invention, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention, which, as a matter of language, might be said to fall therebetween.

What is claimed is:

1. A display device comprising, in combination: a body of substantially flat flexible material of a predetermined configuration, at least one inflatable flexible tubular member including a tube which is adapted to be inflated and which has a pair of spaced-apart flaps along its length, said tubular member being affixed to the periphery of said body of flexible material along a length sufficient to retain said material in an unfurled display condition upon inflation of said member, said portion of the periphery of said body of flexible material being inserted and fixedly secured between said pair of spaced-apart flaps.

2. The display device of claim 1, wherein said body of substantially flat flexible material comprises a flag and wherein said inflatable tubular member comprises an inflatable flag staff affixed to said flag along its one end so as to support said flag when inflated.

3. The display device of claim 2, wherein said inflatable tubular member forms staves along the upper and lower edges of said flag.

4. The display device of claim 1 wherein said body of substantially flat flexible material comprises a sign, and wherein said inflatable flexible tubular member is affixed to said sign about at least a major portion of its periphery, said inflatable tubular member when inflated pulling said sign taut so as to support it for display.

5. The display device of claim 4, wherein said inflatable flexible tubular member extends completely about the entire periphery of said sign.

6. A display device as claimed in claim 3 wherein said portion of said inflatable flexible tubular member forming said staff comprises an inflatable vinyl welt including a bead affixed along a longitudinal edge thereof, and wherein said tubular member further includes tubular elbows, communicating said vinyl welt with said portion of said tubular member forming said staves.

7. The display device of claim 1 wherein said inflatable flexible tubular member is comprised of a length of fabric having a cured resilient, heat sealable material thereon, said length of coated fabric being folded in over-lapped relationship and pinched together a predetermined distance from the free ends thereof to form both said tube and said pair of spaced-apart flaps integral with said tube along its length.

References Cited

UNITED STATES PATENTS

| | | | |
|---|---|---|---|
| 1,964,818 | 7/1934 | Hood | 52—2 |
| 2,072,573 | 3/1937 | Vigliotti | 116—173 |
| 2,825,941 | 3/1957 | Lux et al. | 52—2 |
| 2,827,909 | 3/1958 | Platzke | 135—20.1 |
| 2,909,147 | 10/1959 | Crowder | 116—173 |
| 3,011,810 | 12/1961 | Crowder | 116—173 XR |
| 3,064,725 | 11/1962 | Roark | 160—354 |
| 3,088,235 | 5/1963 | Kies | 40—128 XR |
| 3,089,268 | 5/1963 | Frey et al. | 40—128 |
| 3,119,370 | 1/1964 | Keats | 116—173 |
| 3,127,869 | 4/1964 | Howland | 116—173 |
| 3,149,352 | 9/1964 | Christiansen | 9—8 |
| 3,266,458 | 8/1966 | Ahlquist | 116—173 |
| 3,287,840 | 11/1966 | Keats | 116—63 |

LOUIS J. CAPOZI, Primary Examiner

U.S. Cl. X.R.

40—125